United States Patent
Hellmundt et al.

(10) Patent No.: US 10,539,933 B2
(45) Date of Patent: Jan. 21, 2020

(54) AUTONOMOUS L1-ADAPTIVE CONTROLLER WITH EXACT POLE PLACEMENT

(71) Applicant: Airbus Defence and Space GmbH, Taufkirchen (DE)

(72) Inventors: Fabian Hellmundt, Unterföhring (DE); Jens Dodenhöft, München (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 512 days.

(21) Appl. No.: 15/229,994

(22) Filed: Aug. 5, 2016

(65) Prior Publication Data
US 2017/0060107 A1    Mar. 2, 2017

(30) Foreign Application Priority Data
Aug. 28, 2015   (DE) .......................... 10 2015 114 421

(51) Int. Cl.
*G05B 13/04*    (2006.01)
*B64C 9/00*    (2006.01)

(52) U.S. Cl.
CPC .............. *G05B 13/048* (2013.01); *B64C 9/00* (2013.01)

(58) Field of Classification Search
CPC ........ G05B 13/048; G05B 13/042; B64C 9/00
USPC .......................................................... 700/29
See application file for complete search history.

(56) References Cited

U.S. PATENT DOCUMENTS 9,296,474 B1 *  3/2016  Nguyen .............. G05B 13/048
2011/0196514 A1   8/2011  Cao et al.

OTHER PUBLICATIONS

Hellmundt, Fabien., et al., L1 Adaptive Control with Eigenstructure Assignment for Pole Placement considering Actuator Dynamics and Delays, Airbus Group Innovations, TU Munich, Institute of Flight System Dynamics, Gurching, 85718, Germany.

* cited by examiner

*Primary Examiner* — Chun Cao
(74) *Attorney, Agent, or Firm* — Lorenz & Kopf LLP

(57) ABSTRACT

Embodiments relate to a predictor device for controlling at least one actuating variable of a plant having at least one actuator, which can be controlled by the actuating variable, and a state with at least one controlled variable that can be detected by a sensor. The predictor has an adaptation device and an L1-adaptive control apparatus. The predictor has a state modelling device for estimating a behavior of the plant and outputs an estimated state with at least one estimated variable. The embodiments relate to an aircraft with such a control device for flight control. The embodiments also relate to an L1-adaptive control method using an L1-adaptive control apparatus, an adaptation device generating a matched uncertainty signal and an unmatched uncertainty signal, and a predictor having a state modelling device. The embodiments relate to an aircraft with a control device for flight control, which executes such a method.

5 Claims, 6 Drawing Sheets

US 10,539,933 B2

AUTONOMOUS L1-ADAPTIVE CONTROLLER WITH EXACT POLE PLACEMENT

CROSS-REFERENCE TO RELATED APPLICATION

This application claims the benefit of and priority to German patent application number 10 2015 114 421.2, filed Aug. 28, 2015, which is incorporated by reference herein.

TECHNICAL FIELD

Embodiments of the subject matter described herein relate to a predictor device for a control device for controlling at least one actuating variable of a plant having at least one actuator, which can be controlled by means of the actuating variable, and a state with at least one controlled variable that can be detected by a sensor.

BACKGROUND

There are attempts to use predictor devices of the type mentioned in the introduction particularly in aircraft, in which they are connected to an adaptation device and an L1-adaptive control apparatus to form a control device for controlling actuating variables of the aircraft, e.g., the thrust or position of elevators and/or rudders. In order to be able to determine the effect of the controlling of the actuating variables of the aircraft, sensors are additionally provided that are capable of measuring a state, e.g. an angular rate or a speed of the aircraft.

The plant, which in the case of the aircraft is the aircraft with its associated flight dynamics, has certain uncertainties that make a generally valid constant parametrization of previously used basic control apparatus, which have a PID controller, for example, difficult. In particular, such basic control apparatus are incapable of adequately reacting to changes in the properties of the plant, particularly to changes of a characteristic of the uncertainties that lead to a behavior that differs from a nominal behavior. Therefore, the L1-adaptive control apparatus may be additionally provided in order to limit the effects of deviations from this nominal range or of uncertainties on the control system.

Accordingly, it is desirable to have an improved L1-adaptive controller that addresses the shortcomings mentioned above. Furthermore, other desirable features and characteristics will become apparent from the subsequent detailed description and the appended claims, taken in conjunction with the accompanying drawings and the foregoing technical field and background.

BRIEF SUMMARY

Embodiments of the invention relate to a predictor device for a control device for controlling at least one actuating variable of a plant having at least one actuator, which can be controlled by means of the actuating variable, and a state with at least one controlled variable that can be detected by a sensor. Further, the control apparatus has an adaptation device configured for generating a matched uncertainty signal and an unmatched uncertainty signal, and an L1-adaptive control apparatus. The predictor device has a state modelling device for estimating a behavior of the plant and is configured for outputting an estimated state with at least one estimated variable. Further, embodiments of the invention relate to an aircraft with such a control device for flight control. The subject matter also relates to an L1-adaptive control method using an L1-adaptive control apparatus, an adaptation device generating a matched uncertainty signal and an unmatched uncertainty signal, as well as a predictor device having a state modelling device. Furthermore, the subject matter relates to an aircraft with a control device for flight control, which is configured to execute such a method.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
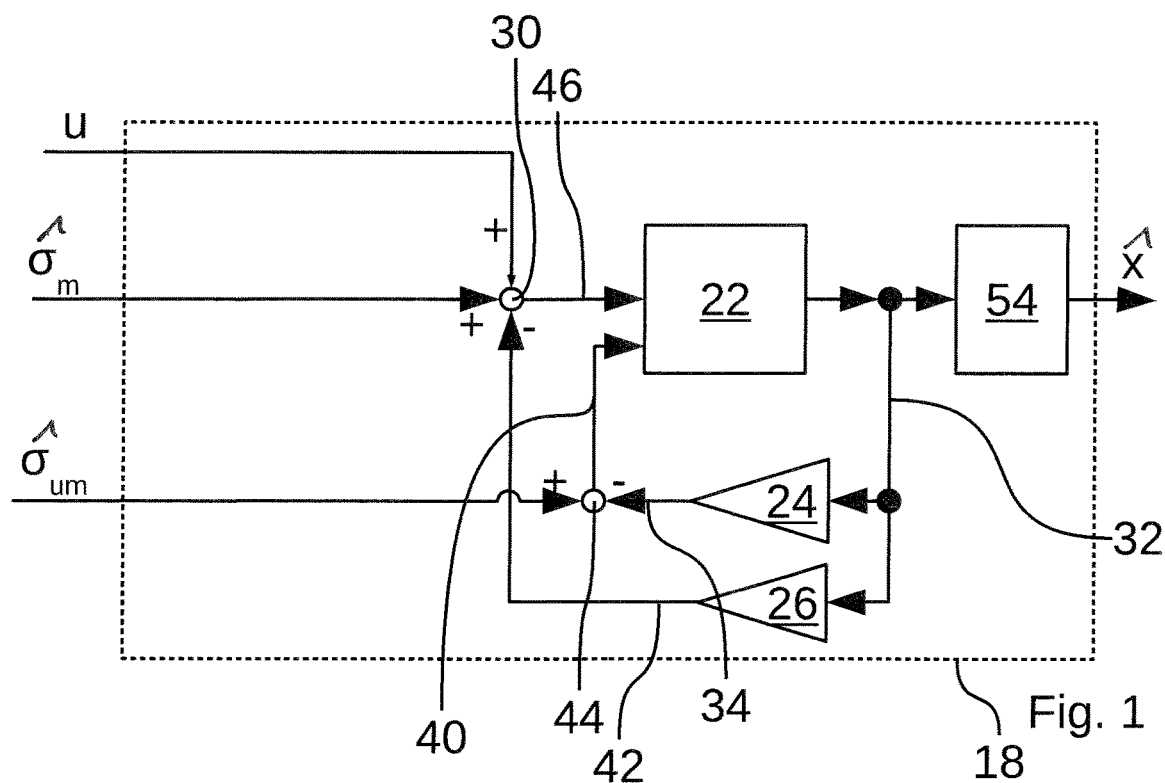
FIG. 1 is a schematic block diagram of a predictor device according to a first embodiment of the present invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Embodiments of the invention are based on the enhancing of a predictor device of the type mentioned in the introduction in such a way that the structure of a control device in which the predictor device can be used can be simplified.

In order to achieve the desired advantages, a predictor device is proposed, which, in addition to the features mentioned in the introduction, has at least one first feedback device for providing a first feedback signal from an output signal of the state modelling device for supplying it to a first combination device, wherein a measured and/or estimated actuator state is supplied to the first combination device, wherein the state modelling device is configured for receiving an unmatched input signal at an unmatched input, wherein the matched uncertainty signal is supplied to the first combination device for combination with the other signals, wherein the first combination device is configured for combining the supplied signals, and wherein the signal obtainable by the first combination device forms a matched input signal for supplying it to a matched input of the state modelling device.

Such a predictor device makes it possible to execute a complete control process solely by means of the adaptive control device and to dispense with a separate baseline control apparatus. In particular, it is thus possible to carry out an exact pole assignment for the control system. This causes the control process thus obtained to exhibit both robustness with respect to uncertainties as well as desired dynamics, despite its simplified structure.

Advantageous embodiments of the invention are the subject matter of the dependent claims.

The predictor device may have a second feedback device for providing a second feedback signal from the output signal for supplying it to a second combination device, wherein the unmatched uncertainty signal is supplied to the second combination device, and wherein the signal obtainable by the second combination device forms an unmatched input signal for supplying it to an unmatched input of the state modelling device.

Due to this dual feedback of matched and unmatched signals and their combination with matched and unmatched uncertainty signals, it is possible, particularly by a suitable choice of gain factors of the first and second feedback devices, to obtain a controlling effect that acts like a common linear feedback of the states of the plant. In this manner, a precise eigenvalue placement is ensured.

The predictor device may have a converter modelling device for estimating the actuator state based on the actuating variable. Thus, the predictor device may also be used if a direct measurement of an actuator state is not possible or not intended.

Advantageously, the converter modelling device may be configured for modelling actuators and/or sensors of the plant. It is thus accomplished that the converter properties of the actuators and of the sensors are incorporated into the estimate of the behavior of the plant and are thus taken into account when executing the control process.

The first feedback device and/or the second feedback device may have a multiplication device. It is thus possible to adapt the effect of the feedback of the output signal of the state modelling device, and thus the properties of the entire control system.

The signal obtainable by means of the first combination device can be obtainable from an addition of the matched uncertainty signal and the output signal of the converter modelling device or at least one selected state variable of the actuator state, as well as a subtraction of the first feedback signal.

The signal obtainable by the second combination device can be obtainable from a subtraction of the second feedback signal from the unmatched uncertainty signal.

Advantageously, the state modelling device is configured for modelling the flight dynamics of an aircraft. Thus, the predictor device and the control device formed therewith can be used for flight control in aircraft.

The advantages are furthermore achieved by an aircraft having a control apparatus for flight control that has a predictor device according to the solution.

Furthermore, an advantage is also achieved by an L1-adaptive control method using an L1-adaptive control apparatus, an adaptation device generating estimates for a matched uncertainty signal and an unmatched uncertainty signal, and a predictor device having a state modelling device, with the steps: feedback of an output signal of the state modelling device into a first feedback device, transforming the output signal into a first feedback signal by means of the first feedback device and generating a matched input signal for the state modelling device by means of the first combination device by addition of the matched uncertainty signal and a measured or estimated actuator state as well as subtraction of the first feedback signal.

Such a method also has the above-mentioned advantages, in particular, that an exact pole assignment in the control system is possible. This results in the control system having both robustness with respect to uncertainties as well as the desired dynamics.

Advantageous embodiments of the method are the subject matter of certain dependent claims.

Advantageously, the method has the steps: feedback of the output signal of the state modelling devices into a second feedback device, transforming the output signal into a second feedback signal by means of the second feedback device, generating an unmatched input signal for the state modelling device by means of the second combination device by subtraction of the second feedback signal from the unmatched uncertainty signal.

Due to this dual feedback of matched and unmatched signals and their combination with matched and unmatched uncertainty signals, it is possible, particularly by a suitable choice of gain factors of the first and second feedback devices, to obtain a controlling effect that acts like a common linear feedback of the states of the plant. In this manner, a precise eigenvalue placement can be ensured.

Furthermore, the method may have the step: estimating an actuator state by means of a converter modelling device, which generates from an actuating variable an output signal forming an estimate of state variables of the actuator state.

Furthermore, an advantage is achieved by an aircraft with a control device for flight control, which is configured for executing the above-mentioned method.

Figure 2:
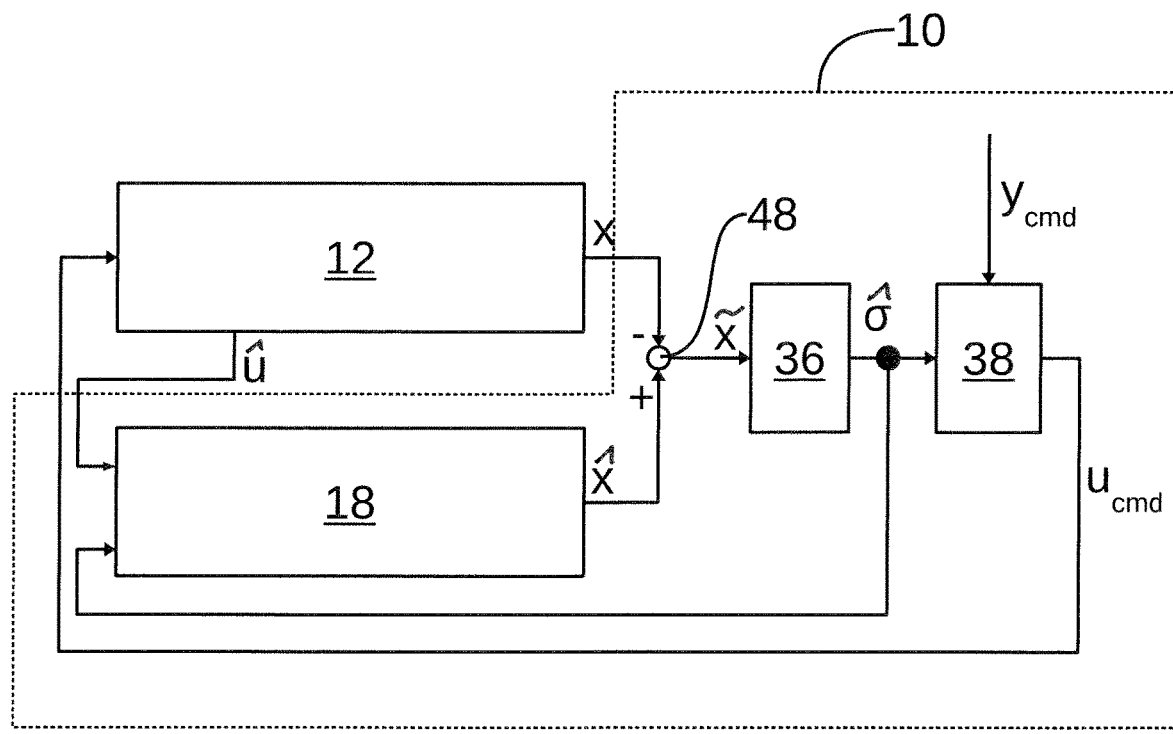
FIG. 2 is a schematic block diagram of a control system with a control apparatus having a predictor device according to a first embodiment of the present invention.
Figure 3:
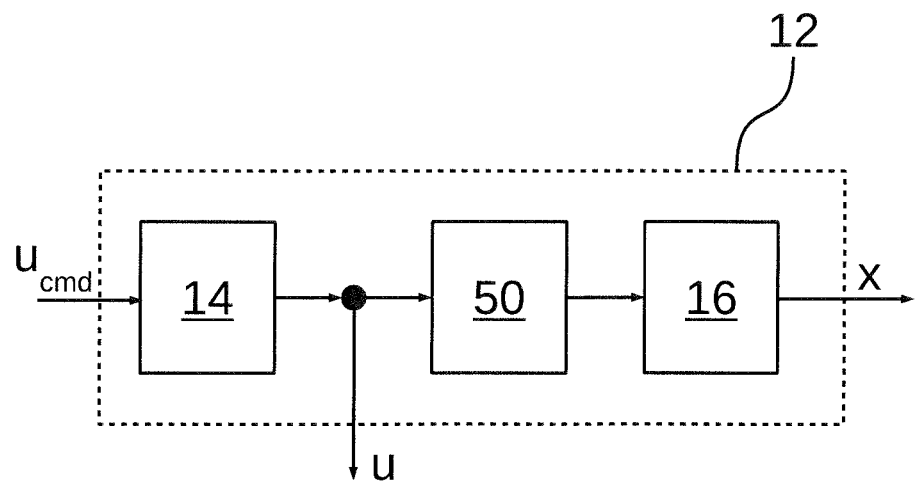
FIG. 3 is a schematic block diagram of a plant from the control system according to FIG. 2.

FIGS. 1 and 3 show a predictor device 18 according to a first embodiment of the present invention for use in a control device 10 for a control system as shown in FIG. 2. In addition to the predictor device 18, the control system has a plant 12, an adaptation device 36 and an L1-adaptive control apparatus 38.

The control device 10 shown in FIG. 2 serves for generating suitable actuating variables $u_{cmd}$ of the plant 12. The plant 12, which, as shown in FIG. 3, for example, may have an aircraft 50, has a state which usually has several state variables and which can be influenced by actuators 14 controllable by actuating variables $u_{cmd}$. In addition, the plant 12 has sensors 16 that are capable of measuring the state variables of the aircraft 50. The result of these measurements forms a state variable x, which may be expressed as a scalar or also as a vector, depending on the application. If it maps several state variables, the state variable may be expressed as a vector with several individual variables as its components. This also applies to other variables, e.g., the actuating variable $u_{cmd}$.

The predictor device 18 serves for estimating an estimated variable $\hat{x}$ obtained from a state variable u and an uncertainty signal $\hat{\sigma}$. The state variable u may be scalar if it has only one component, and may be a vector if it has several components. The uncertainty signal $\hat{\sigma}$, which can be represented as a vector, has two components, for example, in particular a matched uncertainty signal $\hat{\sigma}_m$ and an unmatched uncertainty signal $\hat{\sigma}_m$. The matched uncertainty signal $\hat{\sigma}_m$ and the unmatched uncertainty signal $\hat{\sigma}_{um}$ are provided by the adaptation device 36. The term "matched" relates to the signal referred to in this manner influencing the states or state variable x in the same manner as the actuators of the control system. In contrast, the term "unmatched" refers to signals that influence the states x of the system is a manner complementary to the physical actuators.

In FIG. 3, the actuators 14 can adjust, for example based on the actuating variable $u_{cmd}$, an elevator whose actual deflection (state variable) u is measured, with this measured variable being transmitted to the predictor device 18.

From the deflection u and the uncertainty signal $\hat{\sigma}$ estimated by the adaptation device 36, the predictor device 18 generates an estimated variable $\hat{x}$. For this purpose, the predictor device 18 contains a reproduction of the plant 12. Such a reproduction can be carried out both by electronic or mechanical components and by a purely algorithmic reproduction of the properties of the plant 12. In the present case, the predictor device 18 has, for example, a model of the aircraft 50 and of the sensors 16. The model of the aircraft 50 is contained in a state modelling device 22, the model of the sensors 16 is contained in a sensor modelling device 54.

A prediction error $\tilde{x}$ is calculated by means of an error determination device 48 by subtraction of the controlled variable x from the estimated variable $\hat{x}$. The prediction error $\tilde{x}$ is transmitted to the adaptation device 36, which generates the uncertainty signal $\hat{\sigma}$ from it. As was already described above, the uncertainty signal $\hat{\sigma}$ is transmitted to the predictor device 18 as an additional input variable.

Furthermore, the uncertainty signal $\hat{\sigma}$ is transmitted to the L1-adaptive control apparatus 38 as an input signal. From the uncertainty signal $\hat{\sigma}$ and a command variable $y_{cmd}$, the L1-adaptive control apparatus 38 generates the actuating variable $u_{cmd}$, which in turn is transmitted to the plant 12.

The state modelling device 22 has two inputs for receiving two input signals. One of the inputs receives a matched input signal, the other an unmatched input signal. For use in flight control, the state modelling device 22, for example, generates an estimated angle of attack $\hat{\alpha}$ and an estimated pitch rate $\hat{q}$, which together form the estimated variable $\hat{x}$ as the output signal 32 of the state modelling device 22. In such a case, the estimated variable can be expressed as a vector of the individual variables of the estimated variable $\hat{x}$, for example as follows:

$$\begin{bmatrix} \hat{\alpha} \\ \hat{q} \end{bmatrix}.$$

For feeding back the estimated variable $\hat{x}$ of the state modelling device 22 to its matched and unmatched input, a first feedback device 26 and a second feedback device 24 are provided whose inputs are respectively supplied with the estimated angle of attack $\hat{\alpha}$ and the estimated pitch rate $\hat{q}$, i.e., the output signal 32 of the state modelling device 22. The output signal 32 is represented by a single line in some Figures only for the purpose of simplifying the illustration.

The first feedback device 26 generates a first feedback signal 42, which, together with the matched uncertainty signal $\hat{\sigma}_m$ and the actuating variable u, is supplied to a first combination device 30, which generates a matched input signal 46 for the state modelling device 22 from the supplied signals $\hat{\sigma}_m$, u, the first feedback signal 42, for example by the supplied signals being added up, wherein feedback signals (feedback), in this case the first feedback signal 42, are introduced into the addition with a negative sign (negative feedback), i.e. are subtracted from the sum of the other two signals $\hat{\sigma}_m$, u.

The second feedback device 24 generates a second feedback signal 34, which, together with the unmatched uncertainty signal $\hat{\sigma}_{um}$, is supplied to a second combination device 44, which generates an unmatched input signal 40 from the supplied signals $\hat{\sigma}_{um}$ and the second feedback signal 34 in the same manner as the first combination device 30. The second feedback signal 34 is a negative feedback and is introduced into the addition in the second combination device 44 with a negative sign.

The first feedback device 26 and the second feedback device 24 are formed, for example, by matrix or vector multiplication devices that linearly combine the signals supplied to the feedback device 26, 24 into the respective output signal or feedback signal 42, 34.

Figure 4:
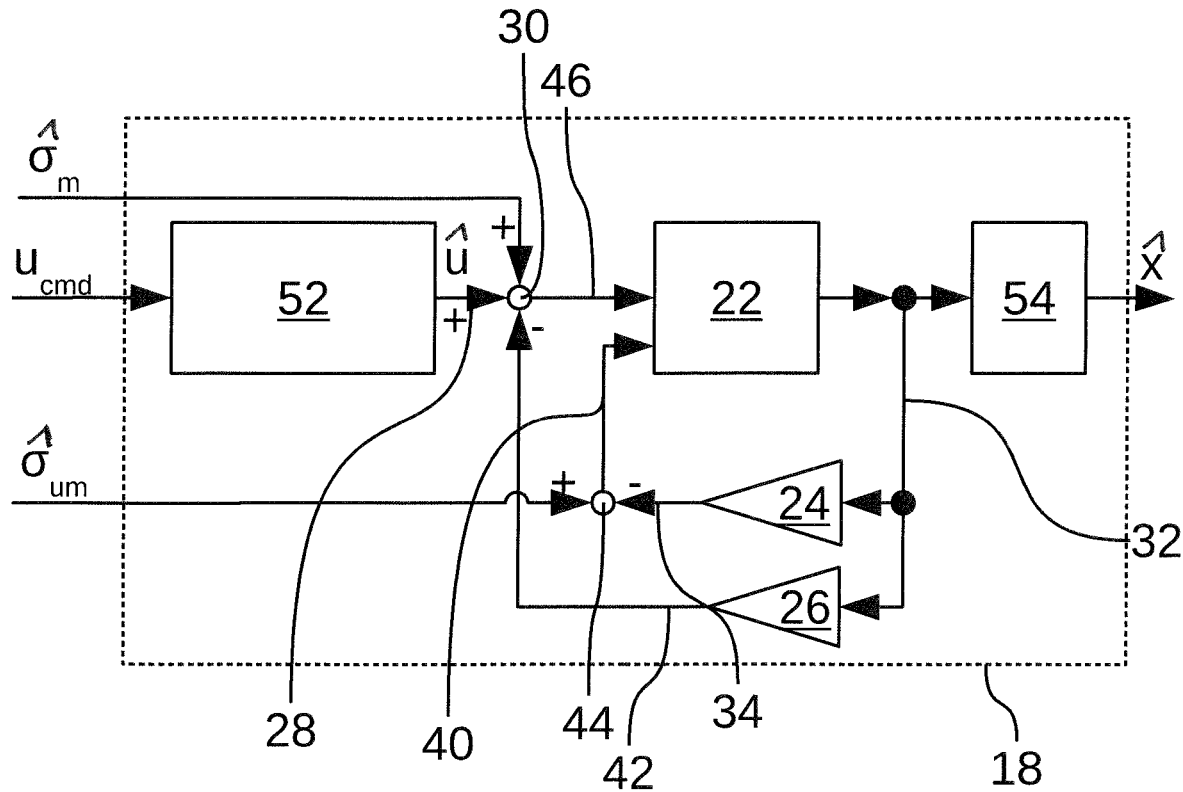
FIG. 4 is a schematic block diagram of a predictor device according to a second embodiment of the present invention.
Figure 6:
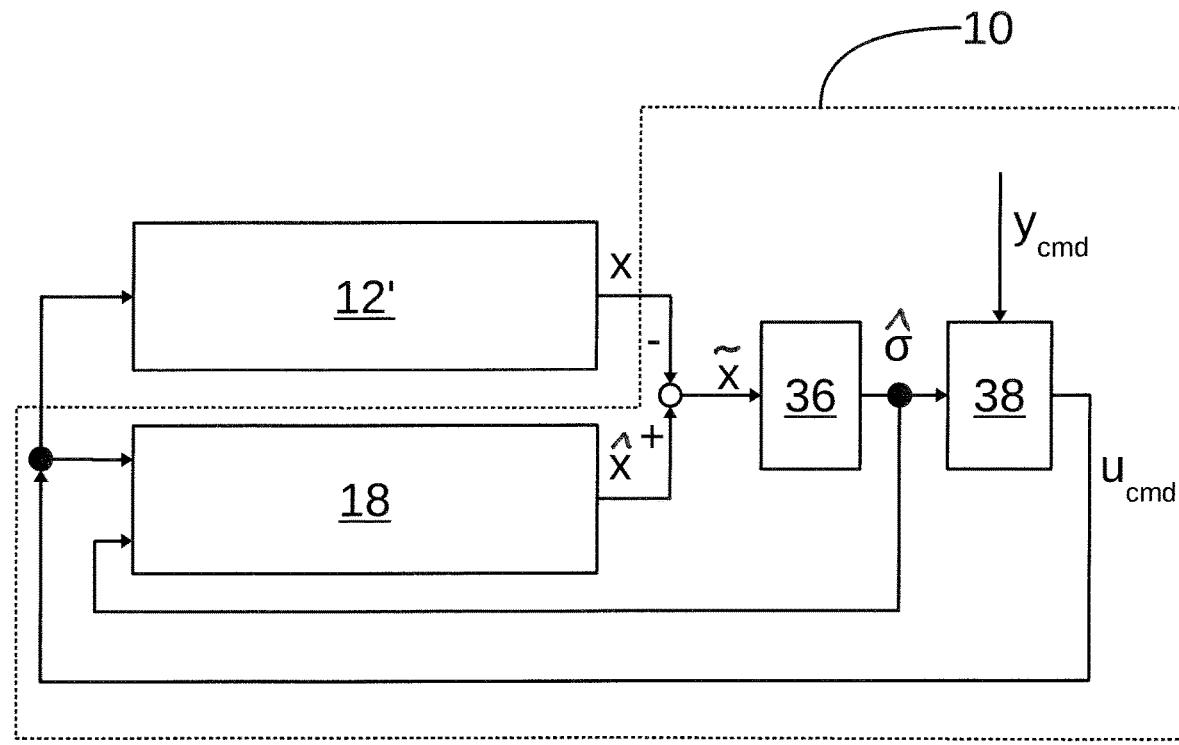
FIG. 6 is a schematic block diagram, as in FIG. 2, with a control apparatus having a predictor device according to a second or third embodiment of the present invention.
Figure 7:
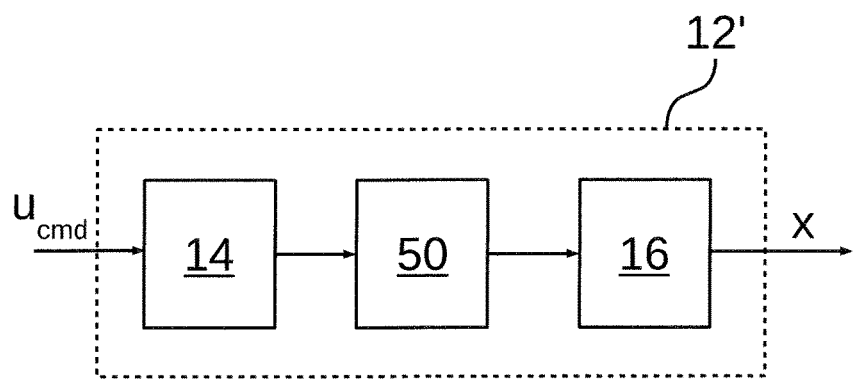
FIG. 7 is a schematic block diagram of a plant for use with a predictor device according to FIG. 4.

FIG. 6 shows a similar control apparatus 10 as in FIGS. 1 and 3. In this case, however, it is not possible in the plant 12' to measure the state of the actuators 14, so that the predictor device 18 shown in FIG. 4, as a reproduction of the plant 12', has, for example in addition to the state modelling device 22 and the sensor modelling device 54, a model of the actuators 14 in the form of an actuator modelling device 52, which generates an output signal 28, which corresponds to an estimated state variable u, from the actuating variable $u_{cmd}$, corresponding to the actuating variable u of the first embodiment. Thus, the output signal 28 replaces the measured state variable u. Therefore, no measurement of the state variable u is necessary. However, the output signal 28 is merely an estimated state variable $\hat{u}$. The associated plant 12' is shown in FIG. 7.

Figure 5:
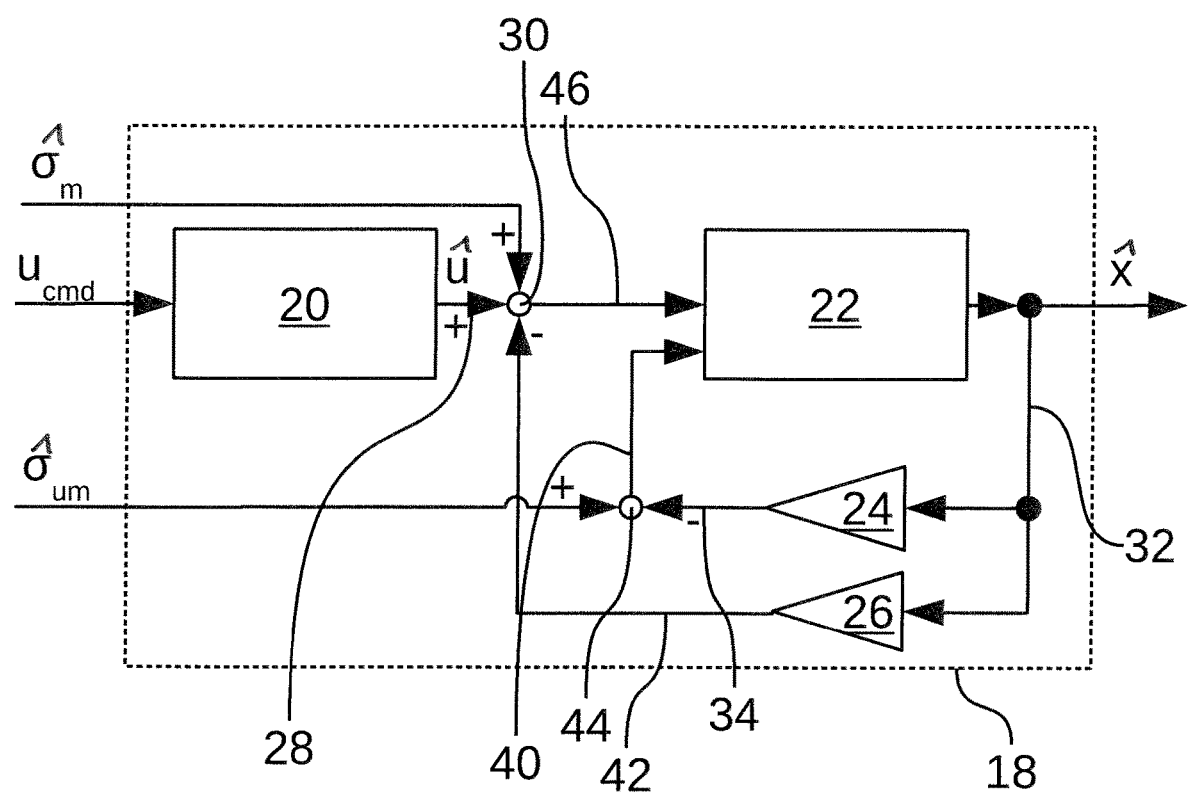
FIG. 5 is a schematic block diagram of a predictor device according to a third embodiment of the present invention.

FIG. 5 shows another simplified embodiment of the predictor device 18 for use in flight control, e.g., for an aircraft of the type F-16, which has a converter modelling device 20 and a state modelling device 22. The actuator modelling device 52 and the sensor modelling device 54 are combined in the converter modelling device 20. This is usually possible since the components are LTI components.

The converter modelling device 20 receives as an input signal the actuating variable $u_{cmd}$ and generates an output signal 28 from it that models the effect of actuators and sensors in the plant 12.

Figure 8:
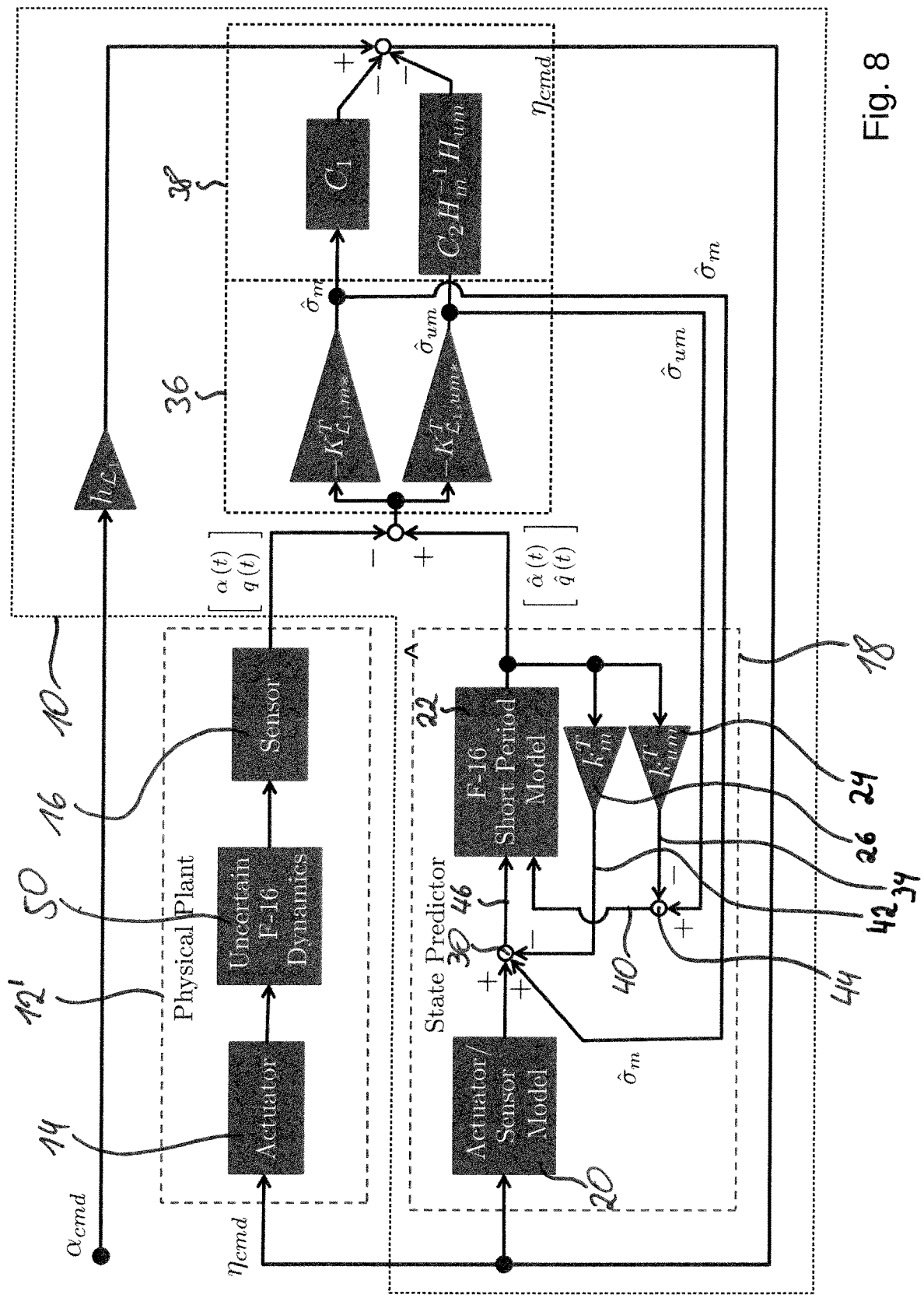
FIG. 8 is a refined schematic block diagram as in FIG. 6.

FIGS. 6 and 8 show a control system in which a predictor device 18 according to the second or third embodiments can be used. The plant 12' is not configured for measuring an actuating variable u.

FIG. 8 shows a closed control system with a control device 10 for flight control, which has a predictor device 18 according to the second or third embodiments. In the present example, the command variable $y_{cmd}$ is formed by the desired angle of attack $\alpha_{cmd}$, and the actuating variable $u_{cmd}$ is formed by a position vector $\eta_{cmd}$. The matched and unmatched branches of the adaptation device 36 and the L1-adaptive control apparatus 38 are shown separately and marked with exemplary transfer functions.

Figure 9:
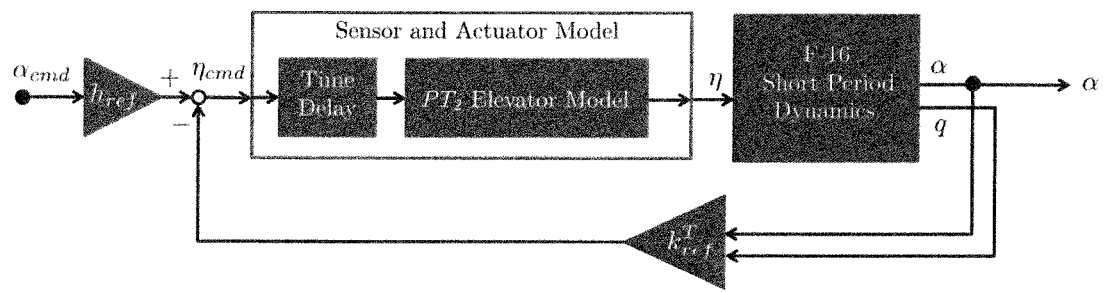
FIG. 9 is a reference model for a plant in the form of an aircraft for the parametrization of a predictor device.

For applications in aircraft flown non-autonomously, a linear input/output behavior is generally desired, because this results in a predictable behavior for a human operator and structural aircraft components can be dimensioned accordingly. Therefore, the desired behavior of the closed control system is, for example, linear. As the example in FIG. 9 shows, a linear reference model can be designed on this premise using a linear approximation of the short-period dynamics of the aircraft and feedback of the outputs. In order to place the poles of the short-period dynamics with the gain factors of the feedback $k_{ref}^T$, eigenstructure placement, for example, can be used as a design strategy. Due to the application of the eigenstructure placement, actuator dynamics and sensor delays can be explicitly incorporated into the calculation. Both the sensor delay and the actuator dynamics should be contained in the reference dynamics because a realistic and achievable reference behavior should be generated for the control following the model. If one of these two parameters were to be neglected, this would render following the reference model impossible because the actual aircraft is subjected to both sensor delays and actuator dynamics. Mathematically, the reference model shown in FIG. 9 is described as follows:

$$\dot{x}_{ref}(t) = A_m x_{ref}(t) +$$

$$B_m \left\{ \hat{G}_D(t) * \hat{G}_A(t) * sat \left[ \int_{t_0}^\tau sat \left( \frac{d(h_{ref} \cdot \alpha_{cmd}(\tau) - k_{ref}^T x_{ref}(\tau))}{d\tau} \right) d\tau \right] \right\}$$

$$y_{ref} = c_m x_{ref} = \alpha_{ref},$$

wherein $x_{ref} = [\alpha_{ref} q_{ref}]^T$ and $\hat{G}_A(t)$ and $\hat{G}_D(t)$ are respectively models of the actuator and the sensor delay. The gain factor of the feedback $k_{ref}^T$ can be parameterized by known methods, e.g., eigenstructure placement using the short-period, the actuator and the delay dynamics. The feed-forward control gain $h_{ref}$ is calculated so that a stationary, precise command sequence is achieved.

The aim of the autonomous control by the control device 10 without the use of a basic control is to achieve a high control quality in the reference model shown above, both under nominal (usual) and non-nominal conditions. Since the intrinsic aircraft dynamics are non-linear even under nominal conditions, the control device 10 has to compensate these non-linearities in order to set the desired linear behavior. At the same time, it must be guaranteed that the deviation from the reference dynamics due to non-nominal behavior of the plant remains within an acceptable range.

The known L1 control architecture was expanded for this control task. Since sensor delays and actuator dynamics, and, to a comprehensive level, saturation, are non-negligible in the consideration of a real aircraft, these effects were also taken into account in the predictor device 18. To neglect these effects would result in a predictor device 18 that deviates substantially from the actual plant, and could lead to an unpredictable control system behavior, e.g., when the actuators are in saturation.

A simple idea for the parameterization of an appropriate predictor device 18 would be to design an integrated state-space model for sensor delays, actuator dynamics and the desired short-period dynamics. Since the estimated variable $\hat{x}$ would in this case comprise actuator and sensor delay states, a measurement of the associated controlled variables x would be necessary to allow the piecewise constant L1 control architecture to calculate the estimation error $\tilde{x}$. Because such measurement results, for example for the delay, are often unavailable in the real world, this approach is avoided.

The predictor device 18 shown in FIG. 5 is only dependent on measurements of the angle of attack $\alpha$ and the pitch rate q. The associated control system is shown in FIG. 8. It should be noted that the diagram in FIG. 8 uses a partitioning $$K_{L1*} := \begin{bmatrix} K_{L1,m*}^T \\ K_{L1,um*}^T \end{bmatrix}$$

of the L1 gain matrix $K_{L1*}$. If the elevator provides a measurement of its deflection $\eta$, the converter modelling device 20 in the predictor device 18 is not absolutely necessary because the measurement can be used instead. Instead, the sensor modelling device 54 may be provided, as in the predictor devices 18 according to the first or second embodiments. A comparison between the actual and the estimated state is carried out only with respect to the angle of attack $\alpha$ and the pitch rate q. Therefore, the predictor device 18 requires no direct measurement of the sensor or actuator state.

All the signals and/or variables transmitted between the devices 18, 20, 22, 24, 26, 30, 36, 38, 44, 48, 52, 54 may be scalars as well as vectors.

The usual L1-adaptive control architecture consists of three different main components: a predictor device 18, an adaptation device 36 (adaptation law) and an L1-adaptive control apparatus 38 (control law). The present invention modifies the dynamics of the predictor device 18 in such a way that a feedback expression is added, by means of the feedback devices 26, 24 and the combination devices 30, 44, to the usual adaptive control signal, for example for the purpose of pole assignment. This modification is achieved by the state of the state modelling device 22, for example the estimated variable $\hat{x}$, being fed back to matched and unmatched inputs of the state modelling device 22, as it is shown in the FIGS. 1, 4, 5 and 8.

Usually, the dynamics of the state modelling device 22 are chosen in such a way that they match the dynamics of the plant 12. The additional feedback according to the present embodiment results in a stimulation of the estimation error, which in turn results in a change of the actuating variable transmitted to the plant 12. By selecting the gain factors of the first and second feedback devices 26, 24 in the predictor device 18, this change of the actuating variable can be configured so as to act as a common linear feedback of the states of the plant. In this manner, a precise eigenvalue placement can be ensured.

Just like in a basic control/baseline control apparatus supplemented with an adaptive controller, the robustness of the control with respect to uncertainties of the plant can be combined with achieving the desired dynamics for the nominal case. The present embodiment achieves this without the use of a conventional linear baseline control apparatus. This leads to a simplification of the controller design and offers a comparable performance.

The technical usefulness of the present embodiment is given particularly in the development and planning of agile airplanes. With regard to agility and maneuverability, the adaptive control demonstrates its strengths, which lie particularly in the quick adaptation of the dynamics. With the previous methods, it was not possible to additionally carry out an exact pole assignment. However, the position of the poles is decisive for the stability and instability of a flying object and is therefore highly relevant, also with respect to a possible certification. An exact positioning/predictability of the poles is relevant because it offers both robustness and the desired dynamics. Cases of application of the invention may reach from manned flying objects to unmanned large and small drones. In particular, with a simple structure, flying characteristics that can be predicted well are achieved by the subject matter described herein.

LIST OF REFERENCE SYMBOLS

10 Control device
12, 12', 12" Plant

14 Actuator
16 Sensor
18 Predictor device
20 Converter modelling device
22 State modelling device
24 First feedback device
26 Second feedback device
28 Output signal (of the converter modelling device 20)
30 First combination device
32 Output signal (of the state modelling device 22)
34 First feedback signal
36 Adaptation device
38 L1-adaptive control apparatus
40 Unmatched input signal
42 Second feedback signal
44 Second combination device
46 Matched input signal
48 Error determination device
50 Aircraft
52 Actuator modelling device
54 Sensor modelling device
$u_{cmd}$ Actuating variable
$\eta_{cmd}$ Actuating variable
x Controlled variable $$\begin{bmatrix} \alpha \\ q \end{bmatrix}$$

Controlled variable
$\hat{x}$ Estimated variable $$\begin{bmatrix} \hat{\alpha} \\ \hat{q} \end{bmatrix}$$

Estimated variable
$\tilde{x}$ Estimation error
$\hat{\sigma}_m$ Matched uncertainty signal (estimate)
$\hat{\sigma}_{um}$ Unmatched uncertainty signal (estimate)
$y_{cmd}$ Command variable While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A predictor device for a control device for controlling an actuating variable of a plant comprising an actuator controlled by the actuating variable, the plant having a state with at least one controlled variable detectable by a sensor, the control device comprising an adaptation device configured to generate a matched uncertainty signal and an unmatched uncertainty signal, and the control device further comprising an L1-adaptive control apparatus, the predictor device comprising:
    a state modelling device having a matched input, an unmatched input, and an output for an estimated state comprising at least one estimated variable;
    a converter modelling device having an input coupled to the output of the state modelling device, wherein the converter modelling device generates as an output an estimate of an actuator state of the actuator;
    a first feedback device having an input coupled to the output of the state modelling device and to the input of the converter modelling device, and the first feedback device further comprising an output for a first feedback signal generated from a first estimated variable that is output by the state modelling device;
    a second feedback device having an input coupled to the output of the state modelling device and to the input of the converter modelling device, and the second feedback device further comprising an output for a second feedback signal generated from a second estimated variable that is output by the state modelling device;
    a first combination device having a first input coupled to the output of the first feedback device, a second input to receive a measured or estimated actuator state, a third input to receive the matched uncertainty signal from the adaptation device, and an output coupled to the matched input of the state modelling device, wherein the first combination device generates a matched input signal by subtracting the first feedback signal from a sum of the measured or estimated actuator state and the matched uncertainty signal, and wherein the matched input signal generated by the first combination device is supplied to the matched input of the state modelling device; and
    a second combination device having a first input coupled to the output of the second feedback device, a second input to receive the unmatched uncertainty signal from the adaptation device, and an output coupled to the unmatched input of the state modelling device, wherein the second combination device generates an unmatched input signal by subtracting the second feedback signal from the unmatched uncertainty signal, and wherein the unmatched input signal generated by the second combination device is supplied to the unmatched input of the state modelling device;
    wherein the state modelling device is configured to estimate a behavior of the plant based on the matched input signal and the unmatched input signal, and is further configured to generate the estimated state.

2. The predictor device according to claim 1, wherein the converter modelling device is configured for modelling actuators and/or sensors of the plant.

3. The predictor device according to claim 1, wherein the first feedback device comprises a multiplication device.

4. The predictor device according to claim 1, wherein the state modelling device is configured for modelling flight dynamics of an aircraft.

5. An aircraft with a control apparatus for flight control, wherein the control apparatus has a predictor device according to claim 1.

* * * * *